(12) United States Patent
Chang et al.

(10) Patent No.: US 10,939,102 B2
(45) Date of Patent: Mar. 2, 2021

(54) POST PROCESSING APPARATUS WITH SUPER-RESOLUTION FILTER AND LOOP RESTORATION FILTER IN BLOCK-LEVEL PIPELINE AND ASSOCIATED POST PROCESSING METHOD

(71) Applicant: MEDIATEK INC., Hsin-Chu (TW)

(72) Inventors: Yung-Chang Chang, Hsinchu (TW);
Chih-Ming Wang, Hsinchu (TW);
Chia-Yun Cheng, Hsinchu (TW);
Chi-Hung Chen, Hsinchu (TW);
Kai-Chun Lin, Hsinchu (TW);
Chih-Wen Yang, Hsinchu (TW);
Hsuan-Wen Peng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/666,380

(22) Filed: Oct. 28, 2019

(65) Prior Publication Data

US 2020/0145658 A1    May 7, 2020

Related U.S. Application Data

(60) Provisional application No. 62/754,027, filed on Nov. 1, 2018.

(51) Int. Cl.
| | | |
|---|---|---|
| *H04N 19/117* | (2014.01) | |
| *H04N 19/82* | (2014.01) | |
| *H04N 19/182* | (2014.01) | |
| *H04N 19/176* | (2014.01) | |

(52) U.S. Cl.
CPC ......... *H04N 19/117* (2014.11); *H04N 19/176* (2014.11); *H04N 19/182* (2014.11); *H04N 19/82* (2014.11)

(58) Field of Classification Search
CPC .. H04N 19/117; H04N 19/176; H04N 19/182; H04N 19/82
USPC ..................................................... 375/240.02
See application file for complete search history.

(56) References Cited

U.S. PATENT DOCUMENTS

| | | | |
|---|---|---|---|
| 2013/0129236 A1 | 5/2013 | Wedi | |
| 2019/0394482 A1* | 12/2019 | Joshi et al. ............ | H04N 19/50 375/240.29 |
| 2020/0045348 A1* | 2/2020 | Boyce et al. ........ | H04N 21/235 |

FOREIGN PATENT DOCUMENTS

EP    2 996 338 A2    3/2016

* cited by examiner

*Primary Examiner* — Allen C Wong
(74) *Attorney, Agent, or Firm* — Winston Hsu

(57) ABSTRACT

A post processing apparatus includes a super-resolution (SR) filtering circuit and a loop restoration (LR) filtering circuit. The SR filtering circuit applies SR filtering to a processing result of a preceding circuit. The LR filtering circuit applies LR filtering to a processing result of the SR filtering circuit. Before the SR filtering circuit finishes SR filtering of all pixels of a frame that are generated by the preceding circuit, the LR filtering circuit starts LR filtering of pixels that are derived from applying SR filtering to pixels included in the frame.

18 Claims, 13 Drawing Sheets

POST PROCESSING APPARATUS WITH SUPER-RESOLUTION FILTER AND LOOP RESTORATION FILTER IN BLOCK-LEVEL PIPELINE AND ASSOCIATED POST PROCESSING METHOD

CROSS REFERENCE TO RELATED APPLICATIONS

This application claims the benefit of U.S. provisional application No. 62/754,027, filed on Nov. 1, 2018 and incorporated herein by reference.

BACKGROUND

The present invention relates to video coding, and more particularly, to a post processing apparatus with a super-resolution filter and a loop restoration filter in a block-level pipeline and an associated post processing method.

The conventional video coding standards generally adopt a block based coding technique to exploit spatial and temporal redundancy. For example, the basic approach is to divide the whole source frame into a plurality of blocks, perform prediction on each block, transform residuals of each block, and perform quantization, scan and entropy encoding. Besides, a reconstructed frame is generated in an internal decoding loop of the video encoder to provide reference pixel data used for coding following blocks. For example, inverse scan, inverse quantization, and inverse transform may be included in the internal decoding loop of the video encoder to recover residuals of each block that will be added to predicted samples of each block for generating a reconstructed frame. The functions of the internal decoding loop of the video encoder are also implemented in a video decoder for recovering residuals of each block and generating a reconstructed frame.

To reduce artifacts resulting from video coding, in-loop filtering tools may be used to process reconstructed frames before the reconstructed frames are stored into a reference frame buffer. In a conventional in-loop filtering design, a fame-level pipeline structure may be employed, where different in-loop filters act as different pipeline stages, and one frame buffer is coupled between two pipeline stages. Hence, a later pipeline stage does not start processing a frame before the frame is fully processed by a previous pipeline stage and available in a frame buffer. Due to inherent characteristics of the fame-level pipeline structure, the processing latency is long and the buffer requirement is high.

SUMMARY

One of the objectives of the claimed invention is to provide a post processing apparatus with a super-resolution filter and a loop restoration filter in a block-level pipeline and an associated post processing method.

According to a first aspect of the present invention, an exemplary post processing apparatus is disclosed. The exemplary post processing apparatus includes a super-resolution (SR) filtering circuit and a loop restoration (LR) filtering circuit. The SR filtering circuit is arranged to apply SR filtering to a processing result of a preceding circuit. The LR filtering circuit is arranged to apply LR filtering to a processing result of the SR filtering circuit. Before the SR filtering circuit finishes SR filtering of all pixels of a frame that are generated by the preceding circuit, the LR filtering circuit starts LR filtering of pixels that are derived from applying SR filtering to pixels included in the frame.

According to a second aspect of the present invention, an exemplary post processing method is disclosed. The exemplary post processing method includes: applying, by a filtering circuit, super-resolution (SR) filtering to a processing result of a preceding operation; and applying loop restoration (LR) filtering to a processing result of the SR filtering. Before SR filtering of all pixels of a frame that are generated by the preceding operation is finished, LR filtering of pixels that are derived from applying SR filtering to pixels included in the frame is started.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
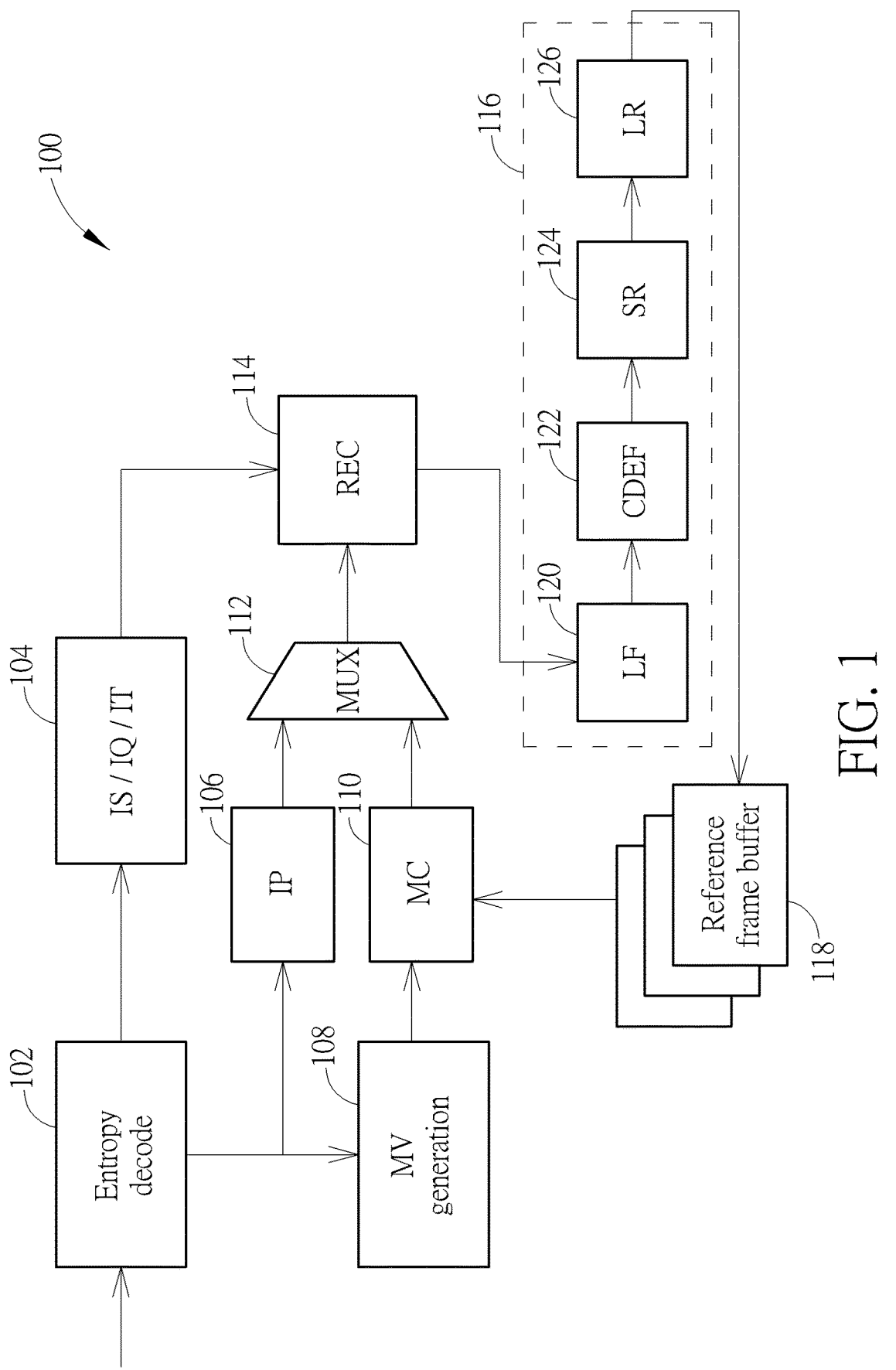
FIG. 1 is a diagram illustrating a video decoder according to an embodiment of the present invention.

FIG. 1 is a diagram illustrating a video decoder according to an embodiment of the present invention. By way of example, but not limitation, the video decoder 100 may be an AV1 video decoder. The video decoder 100 includes an entropy decoding circuit (denoted by "Entropy decode") 102, an inverse scan, inverse quantization, and inverse transform circuit (denoted by "IS/IQ/IT") 104, an intra-prediction circuit (denoted by "IP") 106, a motion vector generation circuit (denoted by "MV generation") 108, a motion compensation circuit (denoted by "MC") 110, a multiplexing circuit (denoted by "MUX") 112, a reconstruction circuit (denoted by "REC") 114, a post processing apparatus 116, and one or more reference frame buffers 118. When a block is encoded by an intra-prediction mode, the intra-prediction circuit 106 is used to determine a predictor, and the reconstruction circuit 114 generates a reconstructed block according to the intra predictor output from the multiplexing circuit 112 and residue provided by the inverse scan, inverse quantization, and inverse transform circuit 104. When a block is encoded by an inter-prediction mode, the motion vector generation circuit 108 and the motion compensation circuit 110 are used to determine a predictor, and the reconstruction circuit 114 generates a reconstructed block according to the inter predictor output from the multiplexing circuit 112 and residue provided by the inverse scan, inverse quantization, and inverse transform circuit 104. A reconstructed frame generated from the reconstruction circuit 114 undergoes post-processing (e.g., in-loop filtering) before the reconstructed frame is stored into the reference fame buffer(s) 118 to serve as a reference frame. Since a person skilled in the pertinent art can readily understand details of entropy decoding circuit 102, inverse scan, inverse quantization, and inverse transform circuit 104, motion vector generation circuit 108, intra-prediction circuit 106, motion compensation circuit 110, multiplexing circuit 112, reconstruction circuit 114, and reference frame buffer(s) 118, further description is omitted here for brevity.

In a case where the video decoder 100 is an AV1 video decoder, the post processing apparatus 116 includes a plurality of in-loop filtering circuits, such as a loop filter (denoted by "LF") 120, a constrained directional enhancement filter (denoted by "CDEF") 122, a super-resolution filter (denoted by "SR") 124, and a loop restoration filter (denoted by "LR") 126. In contrast to the conventional in-loop filtering design using frame-level pipeline architecture only, the proposed post processing design may employ block-level pipeline architecture, wholly or partially. In one exemplary design, the loop filter 120, the CDEF 122, the SR filter 124, and the LR filter 126 are arranged to operate in a block-level pipeline manner. In another exemplary design, the loop filter 120 and the CDEF 122 are arranged to operate in a frame-level pipeline manner, while the SR filter 124 and the LR filter 126 are arranged to operate in a block-level pipeline manner. One frame may be divided into a plurality of super-blocks (SBs). For example, each SB may be a block or multiple blocks for AV1/VP9. For another example, each SB may be a largest coding unit (LCU) or multiple LCUs for High Efficiency Video Coding (HEVC).

It should be noted that the same post processing apparatus 116 may be used in a video decoder. Hence, any video decoder using the proposed post processing design that employs block-level pipeline architecture, wholly or partially, also falls within the scope of the present invention.

Figure 2:
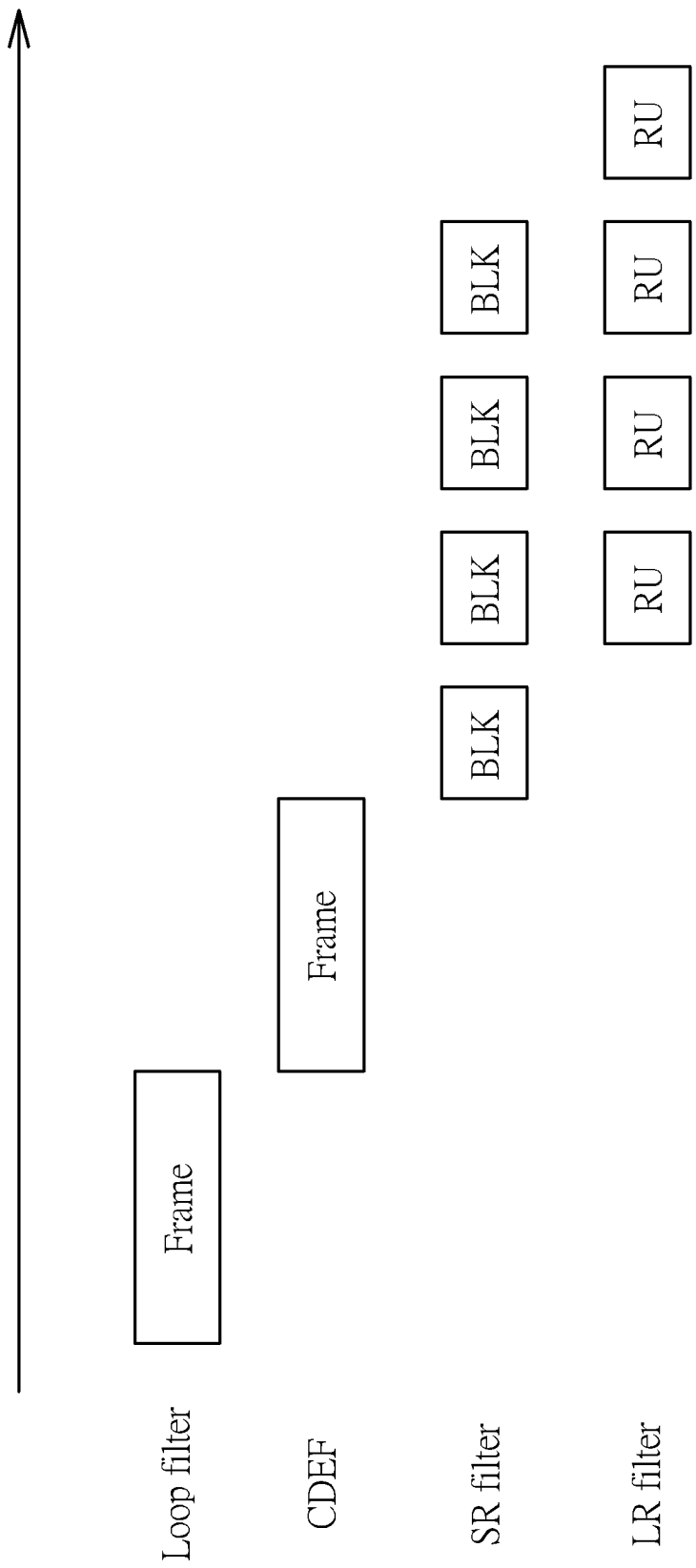
FIG. 2 is a diagram illustrating a first pipeline design of a post processing apparatus shown in FIG. 1 according to an embodiment of the present invention.

FIG. 2 is a diagram illustrating a first pipeline design of the post processing apparatus 116 according to an embodiment of the present invention. In this embodiment, each of the loop filter 120 and the CDEF 122 is implemented using a frame-level pipeline method, and each of the SR filter 124 and the LR filter 126 is implemented using a block-level pipeline method. It should be noted that the SR filter 124 up-scales an output of the preceding pipeline stage (i.e., CDEF 122), and transmits the up-scaled result to the following pipeline stage (i.e., LR filter 126), where the up-scaling ratio is within a range from 8/8 to 16/8, and the up-scaling is performed in a horizontal direction only. In this embodiment, one restoration unit (RU) processed by the LR filter 126 for each block (BLK) processed by the SR filter 124 may be a loop restoration unit (LRU) or multiple LRUs. The SR filter 124 and the LR filter 126 are block-level pipeline stages. Hence, before the SR filter 124 finishes SR filtering of all pixels of a frame that are generated by the preceding circuit, the LR filter 126 starts LR filtering of pixels that are derived from applying SR filtering to pixels included in the frame. Compared to the conventional in-loop filtering design using frame-level pipeline architecture only, the proposed post processing design shown in FIG. 2 has less processing latency, lower buffer requirement, and lower memory bandwidth.

Figure 3:
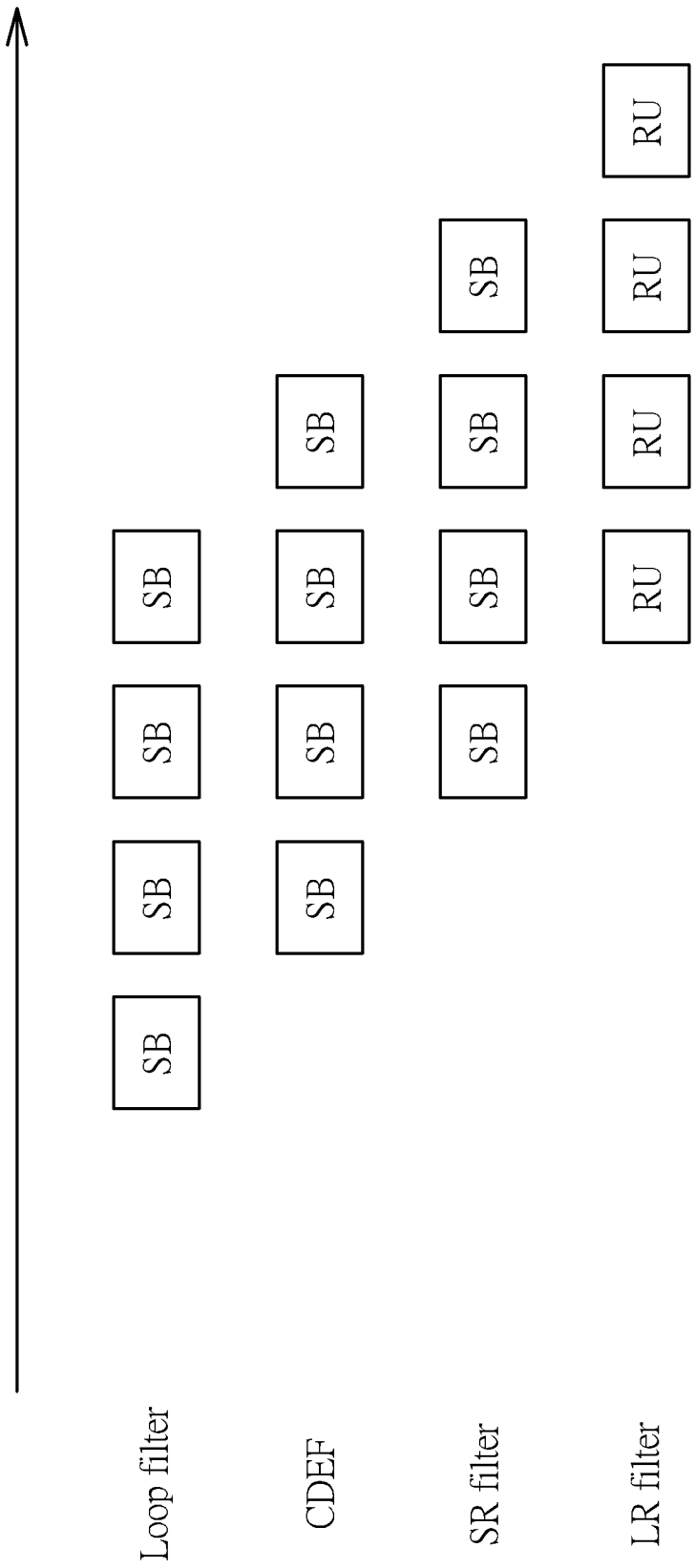
FIG. 3 is a diagram illustrating a second pipeline design of the post processing apparatus shown in FIG. 1 according to an embodiment of the present invention.

FIG. 3 is a diagram illustrating a second pipeline design of the post processing apparatus 116 according to an embodiment of the present invention. In this embodiment, each of loop filter 120, CDEF 122, SR filter 124, and LR filter 126 is implemented using an SB-level pipeline method. As mentioned above, the SR filter 124 up-scales an output of the preceding pipeline stage (i.e., CDEF 122), and transmits the up-scaled result to the following pipeline stage (i.e., LR filter 126), where the up-scaling ratio is within a range from 8/8 to 16/8, and the up-scaling is performed in a horizontal direction only. In this embodiment, one restoration unit (RU) processed by the LR filter 126 for each super-block (SB) processed by the SR filter 124 may be a loop restoration unit (LRU) or multiple LRUs. The SR filter 124 and the LR filter 126 are SB-level pipeline stages. Hence, before the SR filter 124 finishes SR filtering of all pixels of a frame that are generated by the preceding circuit, the LR filter 126 starts LR filtering of pixels that are derived from applying SR filtering to pixels included in the frame. Compared to the conventional in-loop filtering design using frame-level pipeline architecture only, the proposed post processing design shown in FIG. 3 has less processing latency, lower buffer requirement, and lower memory bandwidth.

Figure 4:
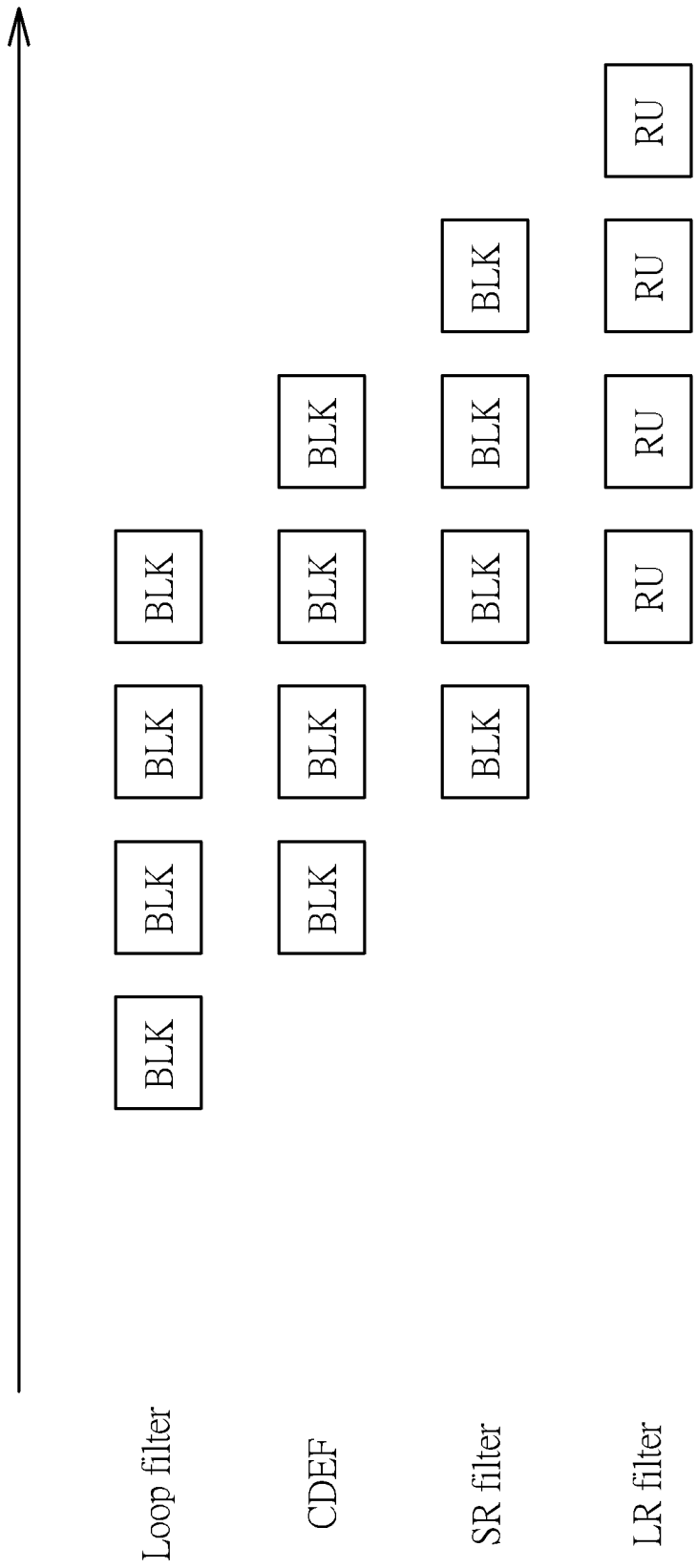
FIG. 4 is a diagram illustrating a third pipeline design of the post processing apparatus shown in FIG. 1 according to an embodiment of the present invention.

FIG. 4 is a diagram illustrating a third pipeline design of the post processing apparatus 116 according to an embodiment of the present invention. In this embodiment, each of loop filter 120, CDEF 122, SR filter 124, and LR filter 126 is implemented using a block-level pipeline method. Each block (BLK) may be a subset of one super block (SB). As mentioned above, the SR filter 124 up-scales an output of the preceding pipeline stage (i.e., CDEF 122), and transmits the up-scaled result to the following pipeline stage (i.e., LR filter 126), where the up-scaling ratio is within a range from 8/8 to 16/8, and the up-scaling is performed in a horizontal direction only. In this embodiment, one restoration unit (RU) processed by the LR filter 126 for each block processed by the SR filter 124 may be a loop restoration unit (LRU) or multiple LRUs. The SR filter 124 and the LR filter 126 are block-level pipeline stages. Hence, before the SR filter 124 finishes SR filtering of all pixels of a frame that are generated by the preceding circuit, the LR filter 126 starts LR filtering of pixels that are derived from applying SR filtering to pixels included in the frame. Compared to the conventional in-loop filtering design using frame-level pipeline architecture only, the proposed post processing design shown in FIG. 4 has less processing latency, lower buffer requirement, and lower memory bandwidth.

It should be noted that the proposed block-level pipeline may operate on the basis of SBs or smaller-sized blocks, depending upon actual design considerations. Hence, the terms "super block (SB)" and "block" may be interchangeable in the following paragraphs.

Figure 5:
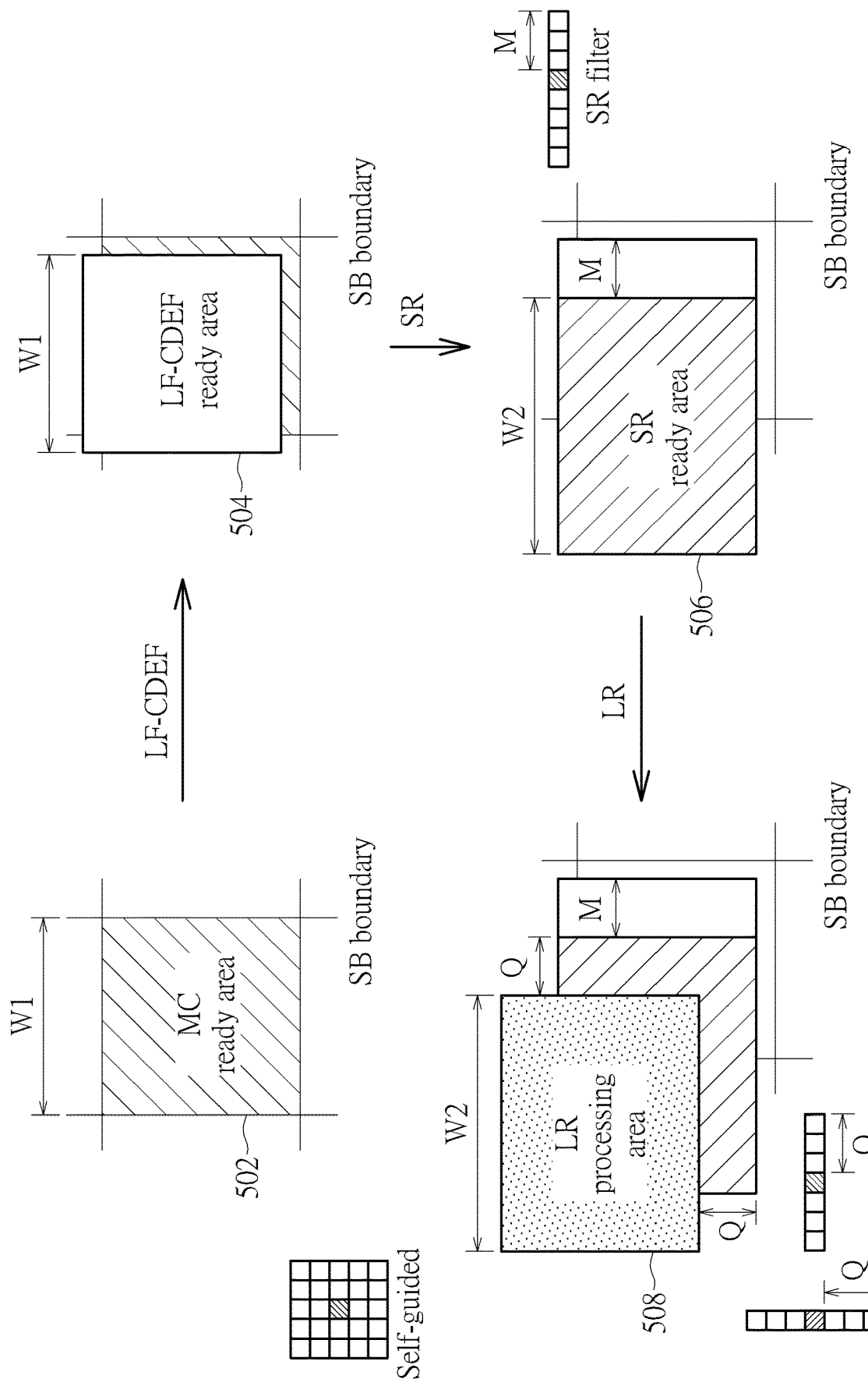
FIG. 5 is a diagram illustrating shift-offsets between different pipeline stages according to an embodiment of the present invention.

To achieve block-level pipeline processing, there are shift-offsets between different pipeline stages due to employed filter algorithms. FIG. 5 is a diagram illustrating shift-offsets between different pipeline stages according to an embodiment of the present invention. When one SB is decoded under inter prediction mode, one corresponding MC ready area 502 is generated at the reconstruction circuit 114. After the MC ready area 502 is available, the loop filter 120 and the CDEF 122 are operative to generate one LF-CDEF ready area 504 according to a portion of pixels included in the MC ready area 502 and a portion of pixels included in neighboring MC ready areas. Since pixels included in a right neighboring MC ready area and a bottom neighboring MC ready area are not available yet, pixels at rightmost columns and bottommost rows of the current MC ready area 502 cannot be filtered by the loop filter 120 and the CDEF 122. Hence, the LF-CDEF ready area 504 is shifted left and top compared to the current MC ready area 502.

After the LF-CDEF ready area 504 is available, the SR filter 124 is operative to generate one SR ready area 506 according to a portion of pixels included in the LF-CDEF ready area 504 and a portion of pixels included in a left neighboring LF-CDEF ready area. Since pixels included in a right neighboring LF-CDEF ready area are not available yet, pixels at M rightmost columns of the current LF-CDEF ready area 504 cannot be filtered by the SR filter 124 with 8 (8=5+M, where M=3) taps. Hence, the SR ready area 506 is shifted left compared to the current LF-CDEF ready area 504.

After the SR ready area 506 is available, the LR filter 126 is operative to perform LR filtering upon pixels included in an LR processing area 508 according to a portion of pixels included in the current SR ready area 506 and a portion of pixels included in neighboring SR ready areas. The LR filter 126 may employ a horizontal wiener filter and a vertical wiener filter each having 7 (7=2Q+1, where Q=3) taps, or may employ a self-guided filter with a size of 5×5. Since pixels included in a right neighboring SR ready area and a bottom neighboring SR ready area are not available yet, pixels at Q rightmost columns and Q bottommost rows of the current SR ready area 506 cannot be filtered by the LR filter 126. Hence, the LR processing area 508 is shifted left and top compared to the current SR ready area 506. It should be noted that the width W2 of the LR processing area 508 is determined by the width W1 of the LF-CDEF ready area 504 generated from the CDEF stage and the up-scaling ratio used at the SR stage.

Figure 6:
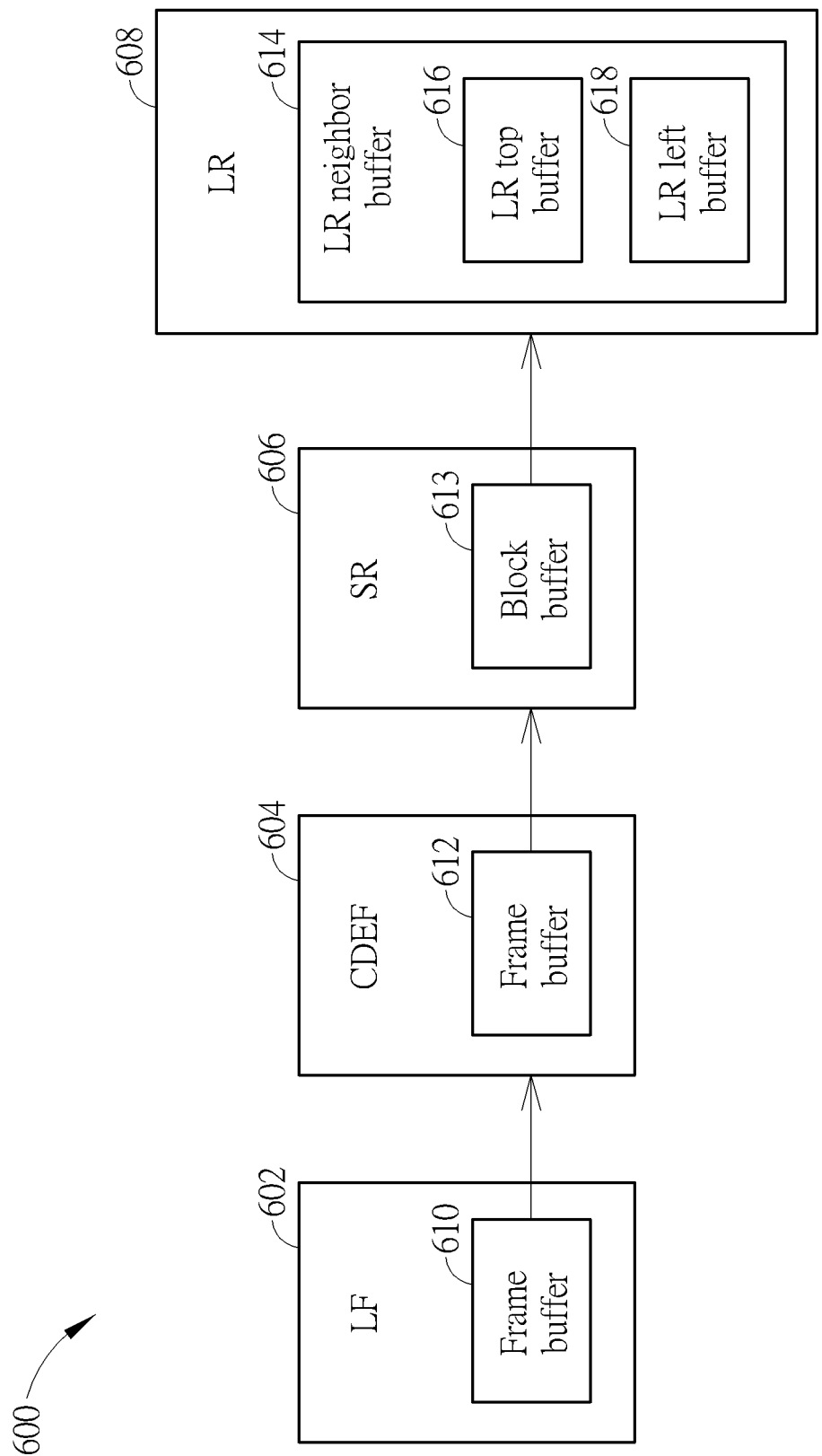
FIG. 6 is a diagram illustrating a first buffer design employed by a post processing apparatus according to an embodiment of the present invention.

Since there are shift-offsets between different pipeline stages due to employed filter algorithms, one or more buffers may be needed for buffering some filtered pixel data associated with a current block such that the buffered pixel data can be used by filtering of other blocks. FIG. 6 is a diagram illustrating a first buffer design employed by a post processing apparatus according to an embodiment of the present invention. In this example, the pipeline design shown in FIG. 2 is adopted. The post processing apparatus 116 shown in FIG. 1 may be implemented using the post processing apparatus 600 shown in FIG. 6. The post processing apparatus 600 includes a plurality of in-loop filtering circuits, such as a loop filter (denoted by "LF") 602, a constrained directional enhancement filter (denoted by "CDEF") 604, a super-resolution filter (denoted by "SR") 606, and a loop restoration filter (denoted by "LR") 608, where the loop filter 602 has a frame buffer 610 used to store one frame that has been processed by loop filtering (e.g., deblocking filtering), the CDEF 604 has a frame buffer 612 used to store one frame that has been processed by constrained directional enhancement filtering, the SR filter 606 has a block buffer 613 used to store one SR ready block that is generated by applying SR filtering to one block (e.g., one super block or a subset of one super block), and the LR filter 608 has an LR neighbor buffer 614 that includes an LR top buffer 616 and an LR left buffer 618 used to buffer some pixels of SR ready blocks.

Figure 7:
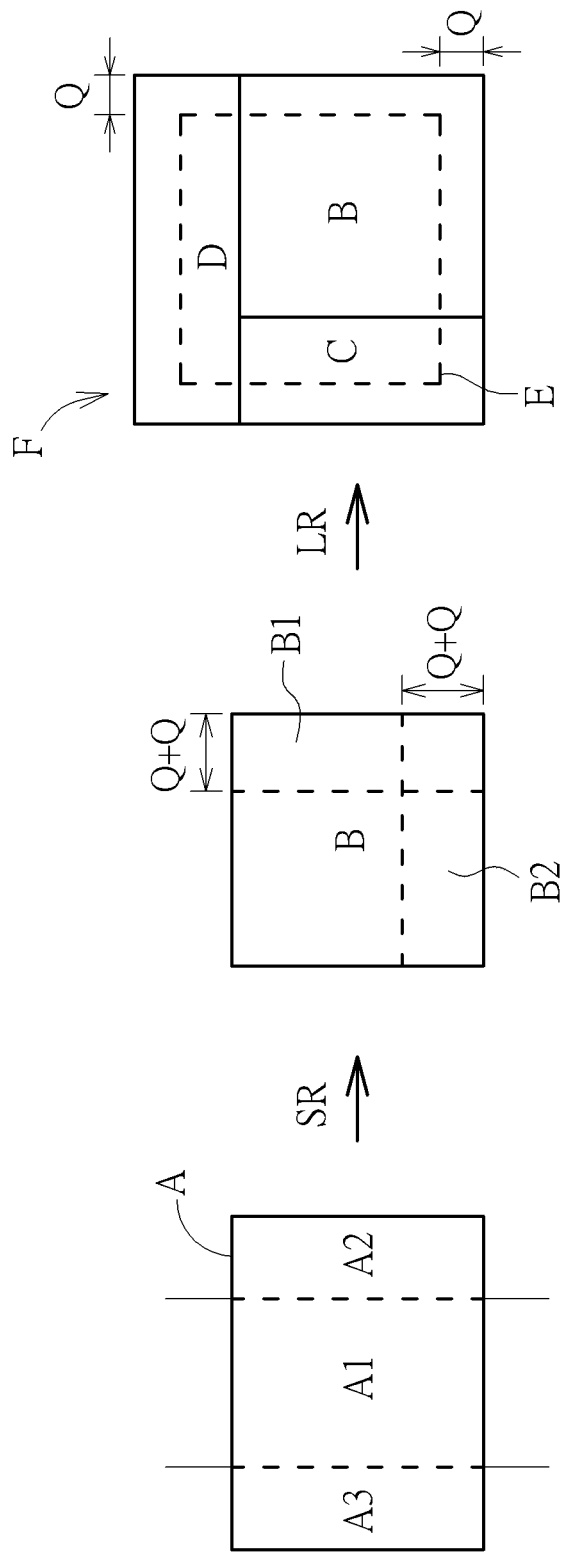
FIG. 7 is a diagram illustrating a block-level pipeline processing operation of a super-resolution filter and a loop restoration filter shown in FIG. 6 according to an embodiment of the present invention.

FIG. 7 is a diagram illustrating a block-level pipeline processing operation of the SR filter 606 and the LR filter 608 shown in FIG. 6 according to an embodiment of the present invention. The SR filter 606 reads a block (denoted by "A1") and its neighboring columns (denoted by "A2" and "A3") directly from the frame buffer 612 of the CDEF 604. The SR filter 606 up-scales at least a portion of a pre-SR area A (which consists of A1, A2 and A3) to generate an SR ready area B, and stores the SR ready area B into the block buffer 613. The LR filter 608 reads pixels included in the SR ready area B from the block buffer 613. The LR filter 608 applies LR filtering to an SR ready area E (which is an LR processing area) according to an SR ready area F, where the SR ready area (LR processing area) E is a part of the SR ready area F, and the SR ready area F includes the SR ready area B, a top neighbor area D with pixels directly read from the LR top buffer 616, and a left neighbor area C with pixels directly read from the LR left buffer 618. The pixels included in the top neighbor area D and the left neighbor area C are obtained from SR ready areas that are adjacent to the SR ready area B and are previously generated by the SR filter 606.

After LR filtering of the SR ready area (LR processing area) E is done, pixels included in the rightmost Q+Q columns and the bottommost Q+Q rows of the SR ready area B are stored into the LR neighbor buffer 614 for next or future processing of LR pipeline stage in the LR block domain, unless the SR ready area B encounters the right boundary or the bottom boundary of a frame. For example, pixels included in the partial SR ready area B1 (which is a right portion of the SR ready area B) are stored into the LR left buffer 618, and pixels included in the partial SR ready area B2 (which is a bottom portion of the SR ready area B) are stored into the LR top buffer 616. When the LR filter 608 applies LR filtering to another SR ready area (LR processing area) that is adjacent to the SR ready area (LR processing area) E, pixels stored in the LR neighbor buffer 614 are used. Specifically, the LR filter 608 applies LR filtering to an SR ready area (LR processing area) according to a larger SR ready area encompassing the SR ready area (LR processing area), where the larger SR ready area includes pixels retrieved from the LR neighbor buffer 614. For example, when the LR filter 608 applies LR filtering to an adjacent SR ready area (LR processing area) that is located right to the right boundary of the current SR ready area (LR processing area) E, pixels included in the partial SR ready area B1 are retrieved from the LR left buffer 618 for LR filtering. For another example, when the LR filter 608 applies LR filtering to an adjacent SR ready area (LR processing area) that is located below the bottom boundary of the current SR ready area (LR processing area)D, pixels included in the partial SR ready area B2 are retrieved from the LR top buffer 616 for LR filtering.

Figure 8:
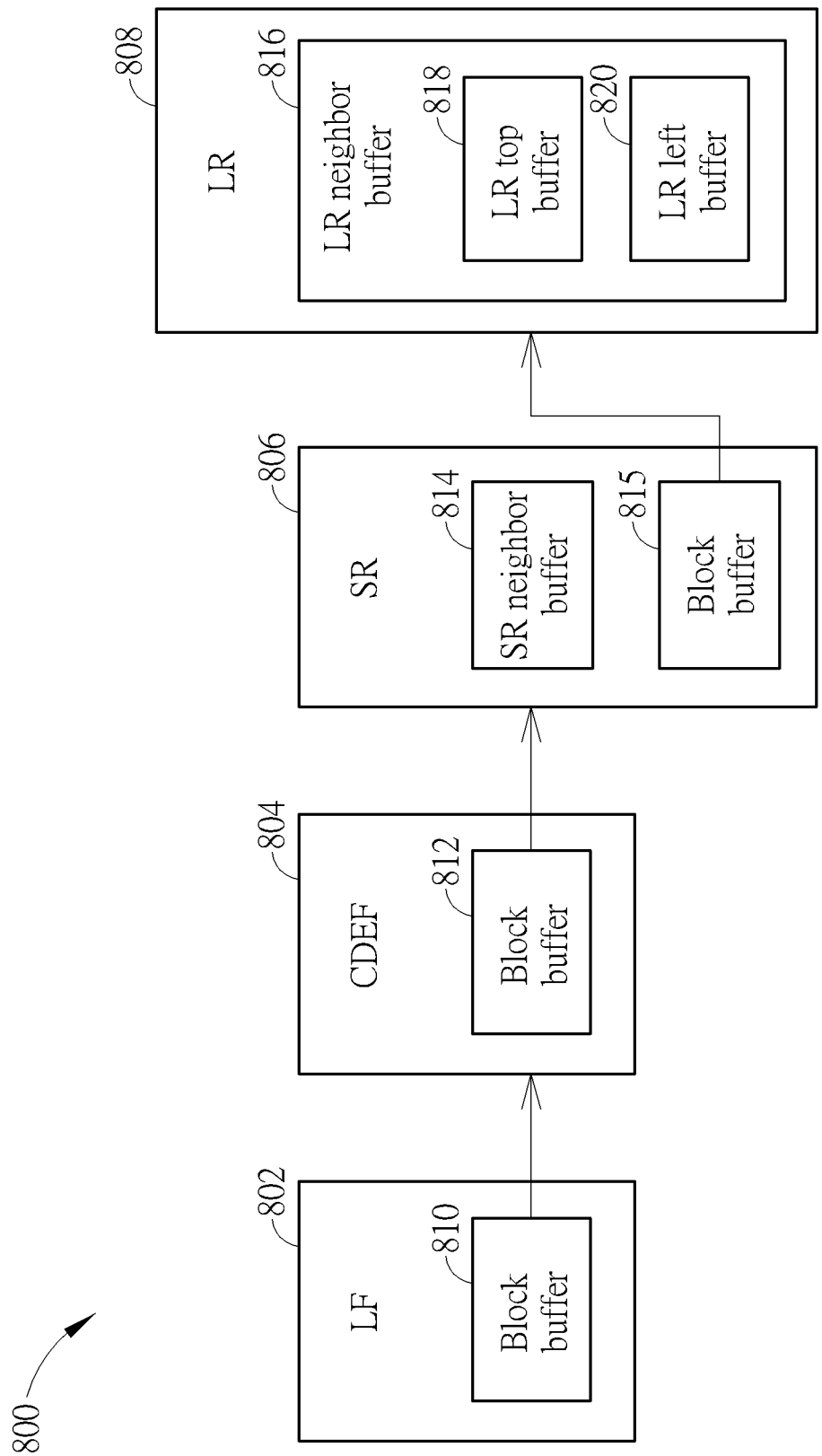
FIG. 8 is a diagram illustrating a second buffer design employed by a post processing apparatus according to an embodiment of the present invention.

FIG. 8 is a diagram illustrating a second buffer design employed by a post processing apparatus according to an embodiment of the present invention. In this example, the pipeline design shown in FIG. 3 or FIG. 4 is adopted. The post processing apparatus 116 shown in FIG. 1 may be implemented using the post processing apparatus 800 shown in FIG. 8. The post processing apparatus 800 includes a plurality of in-loop filtering circuits, such as a loop filter (denoted by "LF") 802, a constrained directional enhancement filter (denoted by "CDEF") 804, a super-resolution filter (denoted by "SR") 806, and a loop restoration filter (denoted by "LR") 808, where the loop filter 802 has a block buffer 610 used to store one LF ready block that has been processed by loop filtering (e.g., deblocking filtering), the CDEF 804 has a block buffer 612 used to store one LF-CDEF ready block that has been processed by constrained directional enhancement filtering, the super-resolution filter 806 has an SR neighbor buffer 814 used to buffer some pixels of LF-CDEF ready blocks and a block buffer 815 used to store one SR ready block that is generated by applying SR filtering to one LF-CDEF ready block, and the loop restoration filter 808 has an LR neighbor buffer 816 that includes an LR top buffer 818 and an LR left buffer 820 used to buffer some pixels of SR ready blocks.

Figure 9:
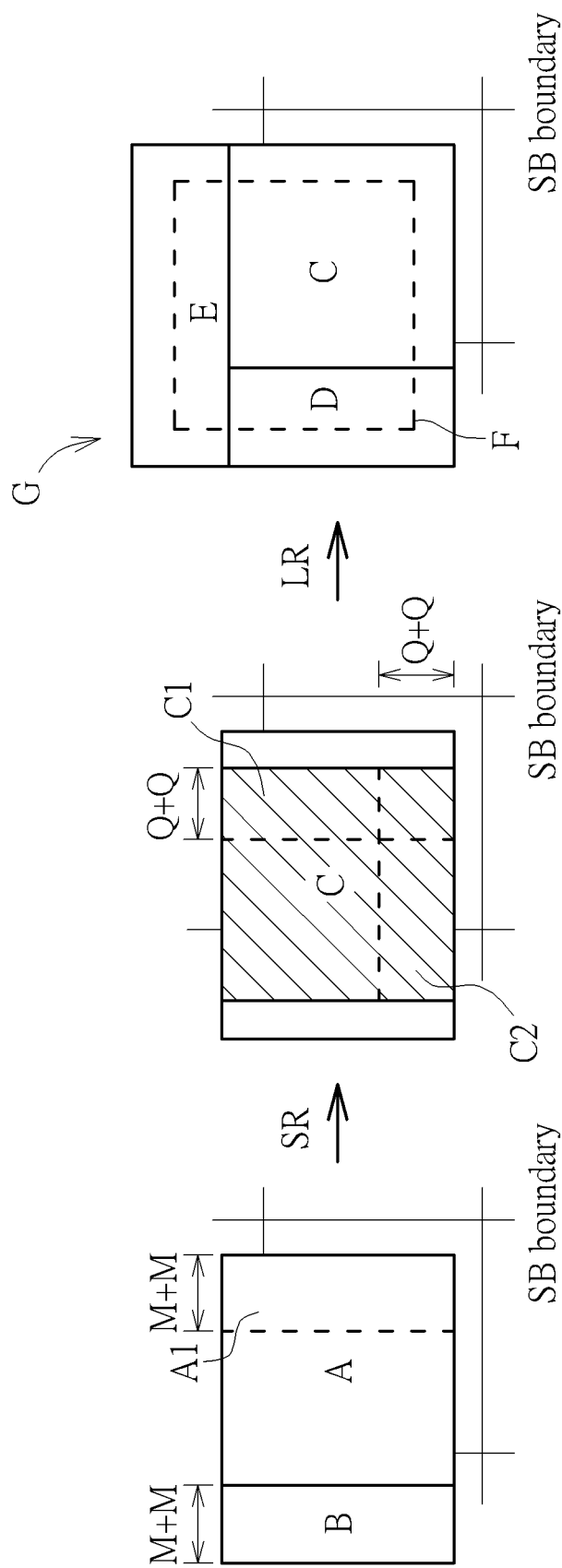
FIG. 9 is a diagram illustrating a block-level pipeline processing operation of a super-resolution filter and a loop restoration filter shown in FIG. 8 according to an embodiment of the present invention.

FIG. 9 is a diagram illustrating a block-level pipeline processing operation of the SR filter 806 and the LR filter 808 shown in FIG. 8 according to an embodiment of the present invention. The SR filter 806 reads a shifted block (which is an LF-CDEF ready area denoted by "A") from the block buffer 812 of the CDEF 804, and reads a left neighbor area with M+M columns (denoted by "B") from the SR neighbor buffer 814 of the SR filter 806. Pixels included in the left neighbor area B are obtained from an LF-CDEF ready area that is adjacent to the shifted block A and is previously generated by the CDEF 804.

The SR filter 806 up-scales at least a portion of a pre-SR area (which consists of A and B) to generate an SR ready area C, and stores the SR ready area C into the block buffer 815. The LR filter 808 reads pixels included in the SR ready area C from the block buffer 815. The LR filter 808 applies LR filtering to an SR ready area F (which is an LR processing area) according to an SR ready area G, where the SR ready area (LR processing area) F is a part of the SR ready area G, and the SR ready area G includes the SR ready area C, a top neighbor area E with pixels directly read from the LR top buffer 818, and a left neighbor area D with pixels directly read from the LR left buffer 820. The pixels included in the top neighbor area E and the left neighbor area D are obtained from SR ready areas that are adjacent to the SR ready area C and are previously generated by the SR filter 806.

After SR filtering of a portion of the pre-SR area A+B is done, pixels included in the rightmost M+M columns of the shifted block A are stored into the SR neighbor buffer 814 for next or future processing of SR pipeline stage, unless the shifted block A encounters the right boundary of a frame. When the SR filter 806 applies SR filtering to a portion of another pre-SR area, pixels stored in the SR neighbor buffer 814 are used. Specifically, the SR filter 806 applies SR filtering to a pre-SR area (which is an SR processing area) according to a larger pre-SR area encompassing the pre-SR area (SR processing area), the larger pre-SR area includes pixels retrieved from the SR neighbor buffer 814. For example, when the SR filter 806 applies SR filtering to another pre-SR area that includes a next shifted block located right to the right boundary of the shifted block A, pixels included in the partial area A1 are retrieved from the SR neighbor buffer 814 for SR filtering.

After LR filtering of the SR ready area (LR processing area) F is done, pixels included in the rightmost Q+Q columns and the bottommost Q+Q rows of the SR ready area C are stored into the LR neighbor buffer 816 for next or future processing of LR pipeline stage in the LR block domain, unless the SR ready area C encounters the right boundary or the bottom boundary of a frame. For example, pixels included in the partial SR ready area C1 (which is a right portion of the SR ready area C) are stored into the LR left buffer 820, and pixels included in the partial SR ready area C2 (which is a bottom portion of the SR ready area C) are stored into the LR top buffer 818. When the LR filter 808 applies LR filtering to another SR ready area (LR processing area) that is adjacent to the SR ready area (LR processing area) F, pixels stored in the LR neighbor buffer 816 are used. Specifically, the LR filter 808 applies LR filtering to an SR ready area (LR processing area) according to a larger SR ready area encompassing the SR ready area (LR processing area), where the larger SR ready area includes pixels retrieved from the LR neighbor buffer 816. For example, when the LR filter 808 applies LR filtering to another SR ready area (LR processing area) that is located right to the right boundary of the SR ready area (LR processing area) F, pixels included in the partial SR ready area C1 are retrieved from the LR left buffer 820 for LR filtering. For another example, when the LR filter 808 applies LR filtering to another SR ready area (LR processing area) that is located below the bottom boundary of the SR ready area (LR processing area) F, pixels included in the partial SR ready area C2 are retrieved from the LR top buffer 818 for LR filtering.

As mentioned above, the width of an SR ready area is up-scaled, so that the width of an LR processing area depends on the up-scaling ratio. Regarding the embodiments shown in FIG. 6 and FIG. 8, the LR filters 608 and 808 need to support all of the up-scaled widths when the block-level pipeline processing method is adopted. Hence, the LR filters 608 and 808 require complicated control. In addition, there is up-scaling processing between CDEF and LR processing, the LR filters 608 and 808 require large LR neighbor buffers. To address these issues, the present invention proposes merging LR left buffer and LR top buffer into the SR pipeline stage. Since neighbor data is stored before being up-scaled, the neighbor buffer size can be reduced. In addition, since the LR pipeline stage does not need to keep neighbor pixels in an LR left buffer and an LR top buffer, the LR control can be simplified.

Figure 10:
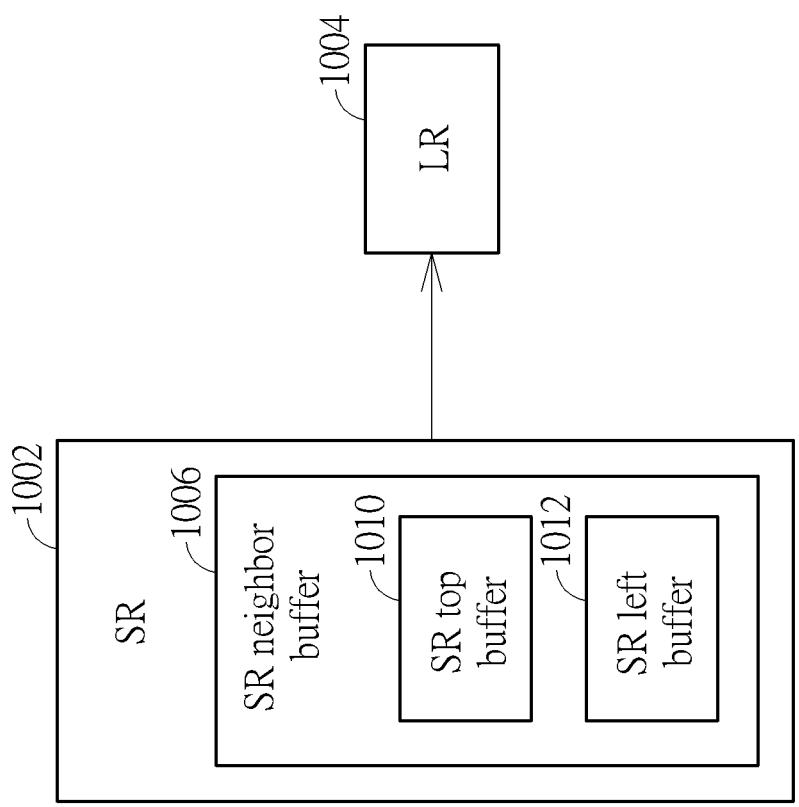
FIG. 10 is a diagram illustrating a third buffer design employed by a post processing apparatus according to an embodiment of the present invention.

FIG. 10 is a diagram illustrating a third buffer design employed by a post processing apparatus according to an embodiment of the present invention. For example, the post processing apparatus 116 may be implemented using the post processing apparatus 600 with the SR filter 606 and the LR filter 608 replaced with the SR filter 1002 and the LR filter 1004, respectively. For another example, the post processing apparatus 116 may be implemented using the aforementioned post processing apparatus 800 with the SR filter 806 and the LR filter 808 replaced with the SR filter 1002 and the LR filter 1004, respectively. As shown in FIG. 10, the SR filter 1002 includes an SR neighbor buffer 1006, where the SR neighbor buffer 1006 includes an SR top buffer 1010 and an SR left buffer 1012. It should be noted that the LR filter 1004 has no LR neighbor buffer. Hence, all the SR ready data needed by the LR filter 1004 are provided by the SR filter 1002 in an on-the-fly up-scaling manner.

Figure 11:
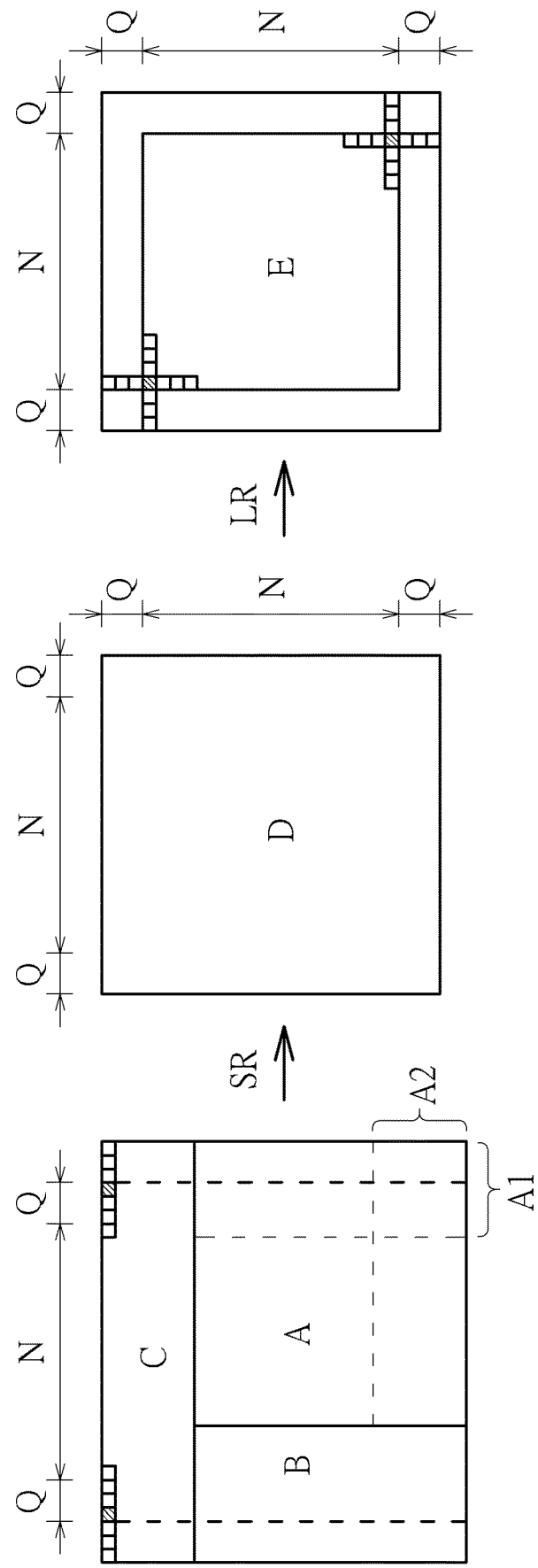
FIG. 11 is a diagram illustrating a block-level pipeline processing operation of a super-resolution filter and a loop restoration filter shown in FIG. 10 according to an embodiment of the present invention.

FIG. 11 is a diagram illustrating a block-level pipeline processing operation of the SR filter 1002 and the LR filter 1004 shown in FIG. 10 according to an embodiment of the present invention. The SR filter 1002 reads an LF-CDEF ready area (denoted by "A") from a frame buffer (or a block buffer) of a preceding constrained directional enhancement filter, reads a left neighbor area (denoted by "B") from the SR left buffer 1012 of the SR filter 1002, and reads a top neighbor area (denoted by "C") from the SR top buffer 1010 of the SR filter 1002. Pixels included in the left neighbor area B and the top neighbor area C are obtained from LF-CDEF ready areas that are adjacent to the LF-CDEF ready area A and are previously generated by the preceding constrained directional enhancement filter. Suppose that the size of one LR processing unit is N×N, where N is a positive integer. In this embodiment, the SR filter 1002 applies SR filtering to a portion of a pre-SR area A+B+C to generate an SR ready area D with the size of (2Q+N)*(2Q+N), and outputs pixels included in the SR ready area C to the LR filter 1004 in an on-the-fly manner. The LR filter 1004 applies LR filtering to an SR ready area E (which is an LR processing area) according to the SR ready area D, where the SR ready area (LR processing area) E is a part of the SR ready area D.

After LR filtering of the SR ready area (LR processing area) E is done, pixels included in rightmost columns and bottommost rows of the LF-CDEF ready area A are stored into the SR neighbor buffer 1006 for up-scaling of next or future (2Q+N)*(2Q+N) blocks, unless the LF-CDEF ready area A encounters the right boundary or the bottom boundary of a frame. For example, pixels included in the partial LF-CDEF ready area A1 (which is a right portion of the LF-CDEF ready area A) are stored into the SR left buffer 1012, and pixels included in the partial LF-CDEF ready area A2 (which is a bottom portion of the LF-CDEF ready area A) are stored into the SR top buffer 1010. When the SR filter 1002 reads another LF-CDEF ready area that is adjacent to the LF-CDEF ready area A, pixels stored in the SR neighbor buffer 1006 are used. Specifically, the SR filter 1002 applies SR filtering to a pre-SR area (SR processing area) according to a larger pre-SR area encompassing the pre-SR area (SR processing area), where the larger pre-SR area includes pixels retrieved from the SR neighbor buffer 1006.

Figure 12:
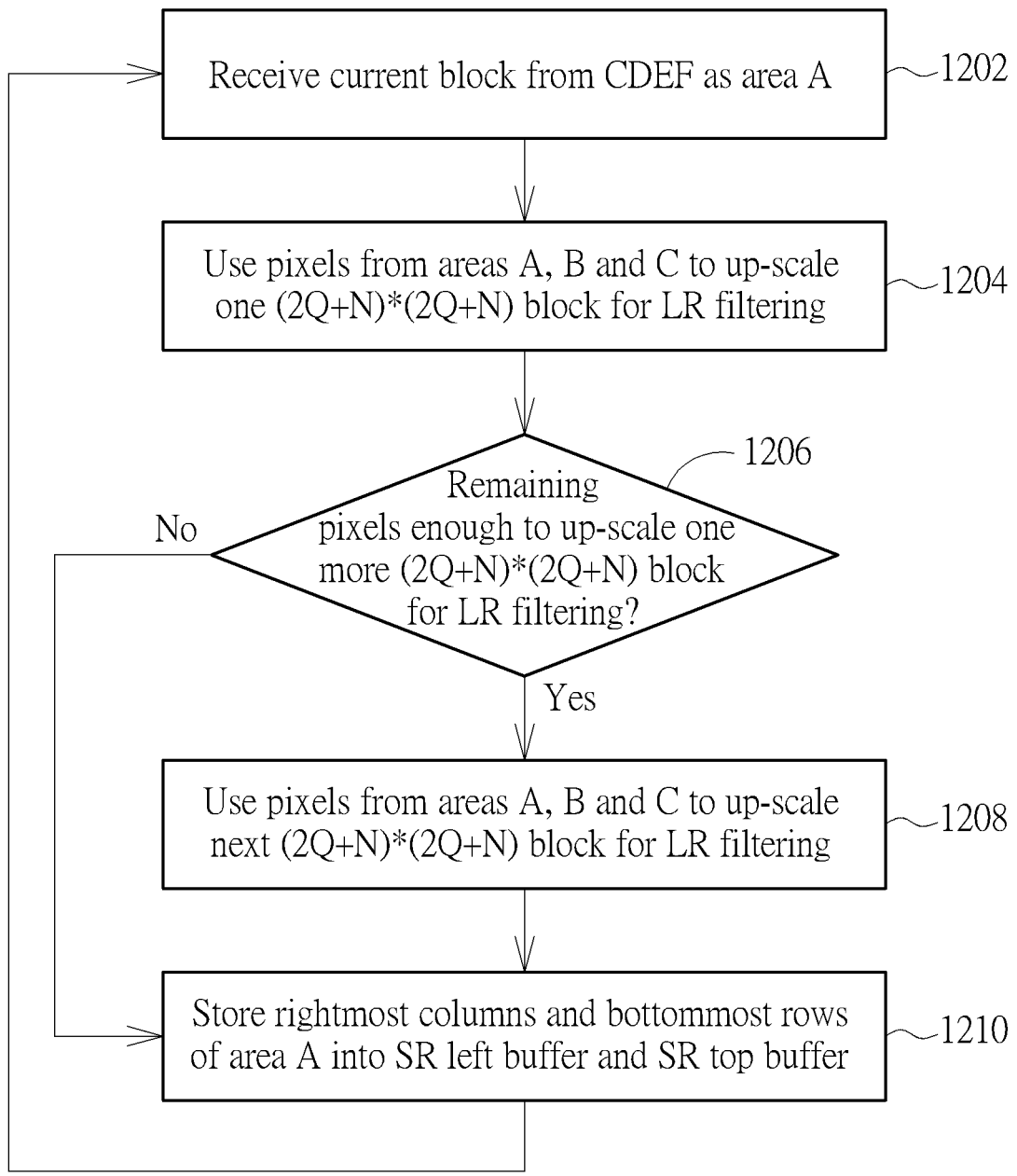
FIG. 12 is a flowchart illustrating a super-resolution up-scaling method according to an embodiment of the present invention.

It should be noted that, in a case where the up-scaling ratio is larger than one, it is possible that pixels included in the pre-SR area A+B+C are used to up-scale more than one (2Q+N)*(2Q+N) block for the following LR filter 1004. FIG. 12 is a flowchart illustrating an SR up-scaling method according to an embodiment of the present invention. The SR up-scaling method may be employed by the SR filter 1002 shown in FIG. 10. At step 1202, the SR filter 1002 receives an LF-CDEF ready area A. At step 1204, the SR filter 1002 uses several pixels included in a pre-SR area A+B+C to up-scale one (2Q+N)*(2Q+N) block for LR filtering. At step 1206, the SR filter 1002 checks if the remaining pixels available in the pre-SR area A+B+C are enough to up-scale one more (2Q+N)*(2Q+N) block. If the remaining pixels available in the pre-SR area A+B+C are not enough to up-scale one more (2Q+N)*(2Q+N) block, the flow proceeds with step 1210. If the remaining pixels available in the pre-SR area A+B+C are enough to up-scale one more (2Q+N)*(2Q+N) block, the SR filter 1002 uses several pixels included in the pre-SR area A+B+C to up-scale the next (2Q+N)*(2Q+N) block for LR filtering. At step 1210, the SR filter 1002 stores rightmost columns and bottommost rows of the LF-CDEF ready area A into the SR neighbor buffer 1006.

Figure 13:
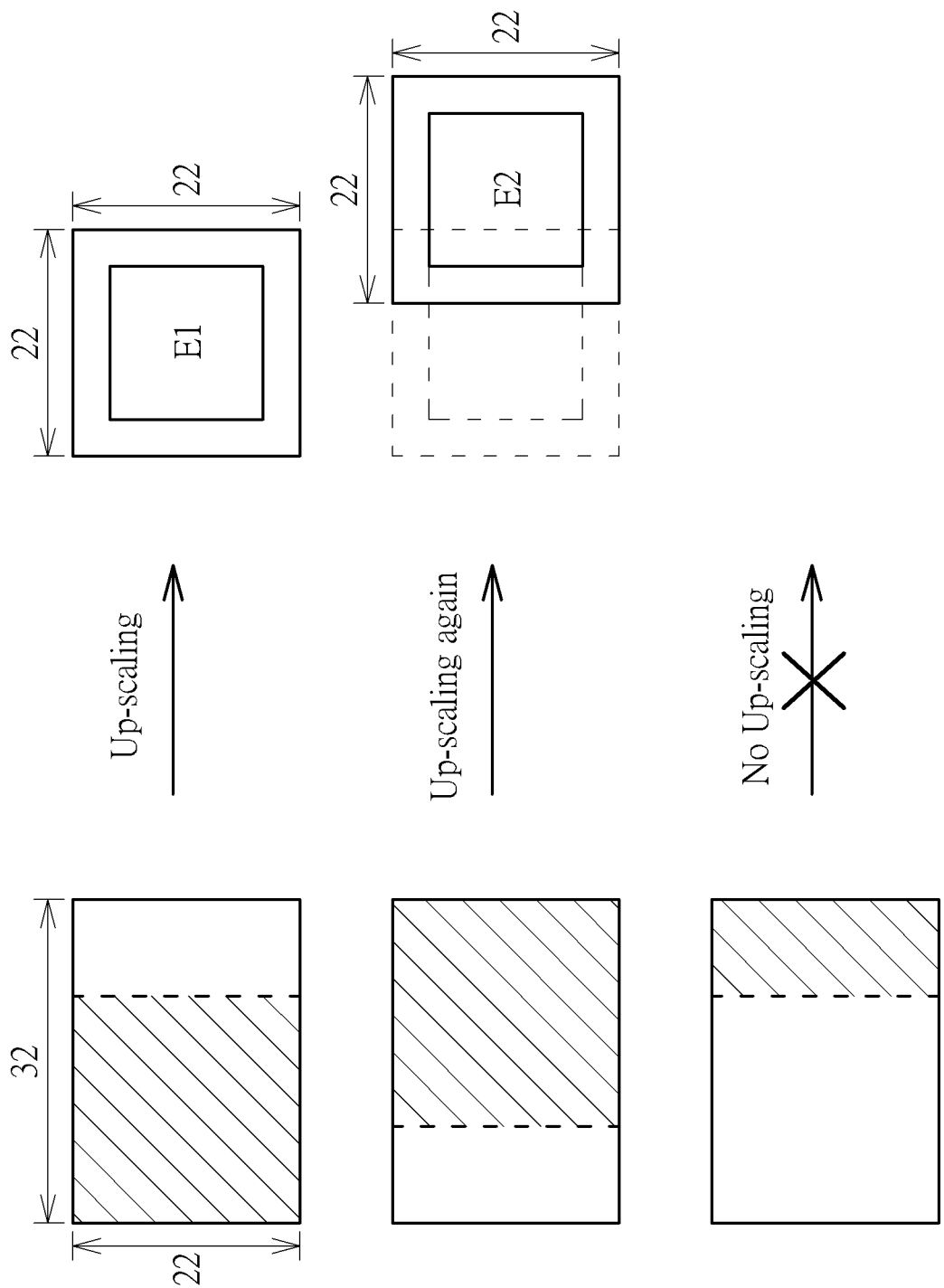
FIG. 13 is a diagram illustrating a super-resolution operation example.

For better understanding of the SR up-scaling method, an SR operation example is illustrated in FIG. 13. Suppose that the size of the pre-SR area A+B+C is 32×22, the size of one LR processing unit E1/E2 is 16×16, and the up-scaling ratio is 2 (i.e., 16/8). A portion of the pre-SR area A+B+C is up-scaled to generate one SR ready area with the size of 22×22 (i.e., (2Q+N)*(2Q+N)=22×22). Another portion of the pre-SR area A+B+C is up-scaled to generate a next SR ready area with the size of 22×22 (i.e., (2Q+N)*(2Q+N)= 22×22). After two (2Q+N)*(2Q+N) blocks are generated by SR up-scaling, the remaining pixels are not enough to up-scale one more (2Q+N)*(2Q+N) block.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A post processing apparatus comprising:
a super-resolution (SR) filtering circuit, arranged to apply SR filtering to a processing result of a preceding circuit; and
a loop restoration (LR) filtering circuit, arranged to apply LR filtering to a processing result of the SR filtering circuit;
wherein before the SR filtering circuit finishes SR filtering of all pixels of a frame that are generated by the preceding circuit, the LR filtering circuit starts LR filtering of pixels that are derived from applying SR filtering to pixels included in the frame.

2. The post processing apparatus of claim 1, wherein the SR filtering circuit and the LR filtering circuit are pipeline stages of a block-level pipeline.

3. The post processing apparatus of claim 1, wherein the LR filtering circuit is arranged to apply LR filtering to a first SR ready area with pixels generated from the SR filtering circuit according to a second SR ready area with pixels generated from the SR filtering circuit, where the first SR ready area is a part of the second SR ready area; and the LR filtering circuit comprises:
an LR neighbor buffer, arranged to buffer pixels included in a portion of the second SR ready area, wherein the LR filtering circuit is further arranged to apply LR filtering to a third SR ready area with pixels generated from the SR filtering circuit according to a fourth SR ready area with pixels generated from the SR filtering circuit, where the third SR ready area is adjacent to the first SR ready area and is a part of the fourth SR ready area, and the fourth SR ready area includes pixels retrieved from the LR neighbor buffer.

4. The post processing apparatus of claim 3, wherein the second SR ready area includes a partial area with pixels that are not retrieved from the LR neighbor buffer, and said portion of the second SR ready area includes a plurality of rightmost columns and a plurality of bottommost rows of the partial area.

5. The post processing apparatus of claim 3, wherein the SR filtering circuit is arranged to apply SR filtering to a first pre-SR area with pixels generated from the preceding circuit according to a second pre-SR area with pixels generated from the preceding circuit, where the first pre-SR area is a part of the second pre-SR area; and the SR filtering circuit comprises:
   an SR neighbor buffer, arranged to buffer pixels included in a portion of the second pre-SR area, wherein the LR filtering circuit is further arranged to apply SR filtering to a third pre-SR area with pixels generated from the preceding circuit according to a fourth pre-SR area with pixels generated from the preceding circuit, where the third pre-SR area is adjacent to the first pre-SR area and is a part of the fourth pre-SR area, and the fourth pre-SR area includes pixels retrieved from the SR neighbor buffer.

6. The post processing apparatus of claim 5, wherein said portion of the second pre-SR area includes a plurality of rightmost columns of the second pre-SR ready area.

7. The post processing apparatus of claim 1, wherein the LR filtering circuit is arranged to apply LR filtering to a first SR ready area with pixels generated from the SR filtering circuit according to a second SR ready area with pixels generated from the SR filtering circuit by using pixels included in a first pre-SR area generated by the preceding circuit, where the first SR ready area is a part of the second SR ready area; and the SR filtering circuit comprises:
   an SR neighbor buffer, arranged to buffer pixels included in a portion of the first pre-SR area, wherein the LR filtering circuit is further arranged to apply LR filtering to a third SR ready area with pixels generated from the SR filtering circuit according to of a fourth SR ready area with pixels generated from the SR filtering circuit by using pixels included in a second pre-SR area generated by the preceding circuit, where the third SR ready area is adjacent to the first SR ready area and is a part of the fourth SR ready area, and the second pre-SR area includes pixels retrieved from the SR neighbor buffer.

8. The post processing apparatus of claim 7, wherein said portion of the first pre-SR area includes a plurality of rightmost columns and a plurality of bottommost rows of the first pre-SR area.

9. The post processing apparatus of claim 1, wherein the preceding circuit comprises a constrained directional enhancement filter (CDEF).

10. A post processing method comprising:
   applying, by a filtering circuit, super-resolution (SR) filtering to a processing result of a preceding operation; and
   applying loop restoration (LR) filtering to a processing result of the SR filtering;
   wherein before SR filtering of all pixels of a frame that are generated by the preceding operation is finished, LR filtering of pixels that are derived from applying SR filtering to pixels included in the frame is started.

11. The post processing method of claim 10, wherein SR filtering and LR filtering performed in a block-level pipeline manner.

12. The post processing method of claim 10, wherein applying LR filtering to the processing result of the SR filtering comprises:
   applying LR filtering to a first SR ready area with pixels generated from the SR filtering according to a second SR ready area with pixels generated from the SR filtering, where the first SR ready area is a part of the second SR ready area;
   storing pixels included in a portion of the second SR ready area into an LR neighbor buffer; and
   applying LR filtering to a third SR ready area with pixels generated from the SR filtering according to a fourth SR ready area with pixels generated from the SR filtering, where the third SR ready area is adjacent to the first SR ready area and is a part of the fourth SR ready area, and the fourth SR ready area includes pixels retrieved from the LR neighbor buffer.

13. The post processing method of claim 12, wherein the second SR ready area includes a partial area with pixels that are not retrieved from the LR neighbor buffer, and said portion of the second SR ready area includes a plurality of rightmost columns and a plurality of bottommost rows of the partial area.

14. The post processing method of claim 12, wherein applying SR filtering to the processing result of the preceding operation comprises:
   applying SR filtering to a first pre-SR area with pixels generated from the preceding operation according to a second pre-SR area with pixels generated from the preceding operation, where the first pre-SR area is a part of the second pre-SR area;
   storing pixels included in a portion of the second pre-SR area into an SR neighbor buffer; and
   applying SR filtering to a third pre-SR area with pixels generated from the preceding operation according to a fourth pre-SR area with pixels generated from the preceding operation, where the third pre-SR area is adjacent to the first pre-SR area and is a part of the fourth pre-SR area, and the fourth pre-SR area includes pixels retrieved from the SR neighbor buffer.

15. The post processing method of claim 14, wherein said portion of the second pre-SR area includes a plurality of rightmost columns of the second pre-SR ready area.

16. The post processing method of claim 10, wherein applying LR filtering to the processing result of the SR filtering comprises:
   applying LR filtering to a first SR ready area with pixels generated from the SR filtering according to a second SR ready area with pixels generated from the SR filtering using pixels included in a first pre-SR area generated by the preceding operation, where the first SR ready area is a part of the second SR ready area;
   storing pixels included in a portion of the first pre-SR area into an SR neighbor buffer; and
   applying LR filtering to a third SR ready area with pixels generated from the SR filtering according to of a fourth SR ready area with pixels generated from the SR filtering using pixels included in a second pre-SR area generated by the preceding operation, where the third SR ready area is adjacent to the first SR ready area and is a part of the fourth SR ready area, and the second pre-SR area includes pixels retrieved from the SR neighbor buffer.

17. The post processing method of claim 16, wherein said portion of the first pre-SR area includes a plurality of rightmost columns and a plurality of bottommost rows of the first pre-SR area.

18. The post processing method of claim 10, wherein the preceding operation comprises constrained directional enhancement filtering.

* * * * *